United States Patent [19]
Stein et al.
[11] 3,868,656
[45] Feb. 25, 1975

[54] REGENERATING CIRCUIT FOR BINARY SIGNALS IN THE FORM OF A KEYED FLIP-FLOP

[75] Inventors: Karl-Ulrich Stein; Karl Goser, both of Munich, Germany

[73] Assignee: Siemens Aktiengesellschaft, Berlin and Munich, Germany

[22] Filed: Dec. 19, 1973

[21] Appl. No.: 426,036

[30] Foreign Application Priority Data
Dec. 19, 1972 Germany .......................... 2262171

[52] U.S. Cl. .......... 340/173 DR, 307/276, 307/291, 340/173 FF
[51] Int. Cl. ............................................ G11c 7/00
[58] Field of Search.... 340/173 R, 173 FF, 173 DR; 307/276, 291

[56] References Cited
UNITED STATES PATENTS
3,292,014 12/1966 Brooksby ..................... 340/173 FF
3,651,492 3/1972 Lockwood ..................... 340/173 R
3,774,176 9/1972 Stein et al. .................... 340/173 FF OTHER PUBLICATIONS
Kleep et al., Regenerative Controlled Decay Storage Cell, IBM Technical Disclosure Bulletin, Vol. 14, No. 1, 6/71, p. 270.

*Primary Examiner*—Stuart N. Hecker
*Attorney, Agent, or Firm*—Hill, Gross, Simpson, Van Santen, Steadman, Chiara & Simpson

[57] ABSTRACT

A regenerating circuit for binary signals in the form of a keyed flip-flop with one labile and two stable points has at least two inverting amplifier stages, featuring feedback, in particular for the stored signals and for the read-out signals of integrated single transistor storage elements which form a storage field. The storage elements of the storage field are connected by way of a digit line to the regenerating circuit and the inverting amplifier stages may be adjusted into the region of the labile point of the circuit by means of a feedback device by way of an inverter stage or an odd number of inverter stages.

7 Claims, 7 Drawing Figures

REGENERATING CIRCUIT FOR BINARY SIGNALS IN THE FORM OF A KEYED FLIP-FLOP

BACKGROUND OF THE INVENTION

1. Field of the Invention

This invention relates to a regenerating circuit for binary signals in the form of a keyed flip-flop having one labile and two stable points, and more specifically to a regenerating circuit which comprises at least two inverting amplifier stages with feedback, and which is provided for the storage signals and the read-out signals of integrated single transistor storage elements of a storage field, wherein the storage elements of the storage field are connected by way of a digit line to the regenerating circuit.

2. Description of the Prior Art

Regenerating circuits for storage signals and read-out signals of integrated single transistor storage elements are well known in the art. In an earlier patent application, now U.S. Pat. No. 3,774,176 assigned to Siemens Aktiengesellschaft, a regenerating circuit of this type is described in which the input and output points of the flip-flop of the regenerating circuit are brought to the same potential by means of an electronic switch prior to a read-out process. Therefore, the flip-flop is brought to its monostable point. In the case of a fully symmetrical flip-flop, this point corresponds to the labile point from which the flip-flop is switched into one of the two stable points.

The production tolerances of the transistors of the flip-flop cause the flip-flop to be generally asymmetrical. In an asymmetrical flip-flop of this type, the labile and the monostable point do not coincide, which results in the circuit failing to analyze, or in it incorrectly analyzing, small read-out signals.

SUMMARY OF THE INVENTION

An object of the invention is to provide a regenerating circuit in which the above-mentioned disadvantages, which are due to asymmetry, are avoided or reduced.

The aforementioned object is realized through the provision of a regenerating circuit having inverting amplifier stages which may be adjusted into the region of the labile point of the circuit by means of a device connected for feedback by way of an inverter stage or an odd number of inverter stages.

A particular advantage of a circuit constructed in accordance with the invention resides in the ability to increase the yield of utilizable circuits during production of regenerating circuits in which all the read-out signals are correctly evaluated and regenerated.

It is advantageously possible to produce even very small read-out signals with the aid of the regenerating circuits in accordance with the invention.

Preferably, the device consists of at least one transistor which connects to another the input and the output of each individual inverting amplifier stage, wherein the flip-flop arms may be separated by electronic switching elements.

Advantageously, the aforementioned arrangement is particularly well suited for a symmetrical design of the flip-flop of the regenerating circuit.

The device, according to the invention, preferably comprises a further, inverting amplifier stage, the output of which is connected to the input and electronic switches arranged between the individual inverting amplifier stages.

This type of arrangement is advantageously particularly well suited for an asymmetrical design of the flip-flop of the regenerating circuit.

BRIEF DESCRIPTION OF THE DRAWING

Other objects, features and advantages of the invention, its organization, construction and operation will be best understood from the following description of preferred embodiments of the invention, taken in conjunction with the accompanying drawings, on which.

DESCRIPTION OF THE PREFERRED EMBODIMENTS

Figure 1:
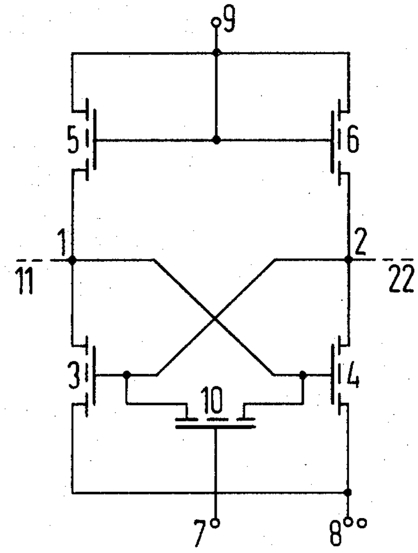
Fig. 1 PRIOR ART
FIG. 1 is a schematic circuit diagram of a known flip-flop in which an electronic switch is connected between the input and output points.

The flip-flop circuit illustrated in FIG. 1 fundamentally consists of two switching transistors 3 and 4 and corresponding load resistors 5 and 6. The load resistors take the form of field effect transistors, the gate terminals of the transistor in each case being connected to their drain electrodes. The input and output points of the regenerating circuit are referenced 1 and 2. The point 1 is connected to a digit line 11 and the point 2 is connected to a digit line 12. The read out signals are supplied by way of the digit lines to the regenerating circuit.

An electronic switch 10 is provided between the points 1 and 2. In the electrically conductive state of the electronic switch 10, the points 1 and 2 are electrically connected to one another and therefore inevitably carry approximately the same potential. In the electrically blocked state of the transistor 10, the points 1 and 2, as is typical of a flip-flop circuit, can assume two stable points which are complementary to each other, when an appropriate electrical supply voltage is connected to the terminals 8 and 9 of the flip-flop circuit. The switch over of the transistor 10 from one state to the other is effected by the application of an appropriate potential to the terminal 7, its gate electrode. As a result of the electric short circuit between the points 1 and 2, the flip-flop circuit is, prior to the read-out process, forced into an operative point—the labile point—-which represents the labile state of equilibrium between the two stable states of the flip-flop circuit.

Figure 2:
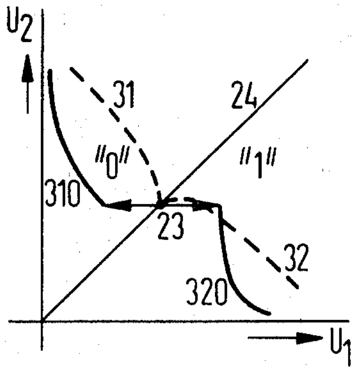
FIG. 2 is a graphic illustration of the characteristic curve of a flip-flop constructed as illustrated in FIG. 1.

FIG. 2 represents the behavior of the flip-flop circuit illustrated in FIG. 1 in dependence upon the voltages $U_1$ and $U_2$, applied to the points 1 and 2. If the transistor 10 is rendered conductive, then the monostable point 23, depending upon which stable state the flip-flop has assumed, is reached on one of the curve arms 31 or 32. In the case of a completely symmetrical flip-flop, this point 23 lies on a straight line 24 which separates the two stable states. When the read-out signals pass via the digit lines to one of the points 1 or 2, the supply voltage is disconnected, i.e., no voltage is connected to the points 8 and 9. The read-out signals change the potential prevailing at the point 1 and at the point 2, so that the point 1 and the point 2 carry a potential which is greater or smaller than the corresponding potential of the point 23 in FIG. 2. After the connection of the flip-flop, the read-out signals are regenerated, i.e., the original charge stored in a storage field is conducted back to this field. Depending upon whether the state 0 or 1 is recorded back into a storage field, the characteristic curve 310 or 320 will apply.

Figure 3:
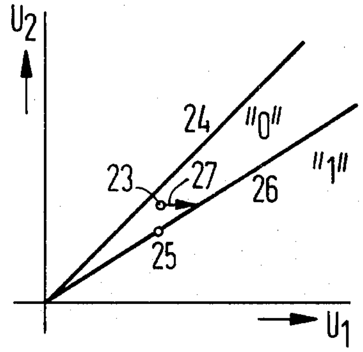
FIG. 3 schematically illustrates the characteristic curve of a flip-flop which is asymmetrical, due to production tolerances of the transistor.

Production tolerances in the transistors of the flip-flop cause asymmetry of the flip-flop. In this case, the monostable point 23 no longer lies on the straight line 24 which divided the two stable states of the flip-flop from each other. Instead, the point 23, as represented in FIG. 3, lies outside the straight line 26 separating the stable states. If, at the point 1 of the flip-flop, there now occurs a voltage which is smaller than or equal to the voltage represented by the arrow 27, this voltage is evaluated as 0. That is to say, that in order to be able to evaluate a voltage through a flip-flop as a 1, this voltage must be greater than the distance of the point 23 from the straight line 26.

In accordance with the invention, it is now proposed that suitable measures be introduced to displace the point 23 in such a manner that it lies as close as possible to the straight line 26, i.e., that the voltage which must be applied in order to be able to pass from the point 23 to the other side of the straight line 26, is now as low as possible.

Regenerating circuit constructed in accordance with the invention, in which the point 23 lies close to the straight line 26, will be described below.

The regenerating circuit illustrated in FIG. 4 again comprises the two switching transistors 3 and 4 and the two load elements 5 and 6. Details of FIG. 4 which have already been described bear the same reference characters. The flip-flop illustrated in FIG. 4 differs from that in FIG. 1 in that, in accordance with the invention, the two flip-flop arms may be cut off prior to read-out by means of two electronic switches 12 and 13, which are preferably, as are the transistors 3, 4, 5 and 6, field effect transistors. Likewise, prior to read-out, the potential is individually set at the points 1 and 2 by way of a pair of transistors 14 and 15, which are preferably also field effect transistors. The transistors 12 and 13 are able to be operated by way of the input 130, and the transistors 14 and 15 may be operated by application of a suitable potential to the input 140. FIG. 5 schematically illustrates the pulses which are applied to the individual inputs of the regenerating circuit.

At the time t1, the flip-flop of the regenerating circuit is switched on. In the following discussion, it will be assumed that the regenerating circuit is designed in the n-channel technique. Therefore, at the time t1, the input 9 carries negative potential, for example $\pi 9 = -10V$, whereas the input 8, for example, carries the potential of $\pi 8 = 0V$. At the time $t$2, the read-out process is introduced. First of all, the potential $\pi 130$, which amounts for example to $-10V$ is cut off from the input 130. This has the effect of blocking the transistors 12 and 13 in the flip-flop arms which were previously conductive. Advantageously, the transistors 14 and 15 are simultaneously switched conductive by means of the application of the potential $\pi 140$, which preferably amounts to $-10V$. These switching processes cause the potentials $U_1$ and $U_2$ carried at the time $t$2 by the points 1 and 2 to be changed in a predetermined manner. In FIG. 5, it is to be assumed that the potential $U_1$ connected to the node 1 is reduced and that the potential $U_2$ connected to the node 2 is increased. At the time $t$3, the flip-flop is switched off. For this purpose, the potential 0 is applied to the input 9, and the potential $\pi 8$ of $-10V$ is applied to the input 8. By way of the input 140, the transistors 14 and 15 are again blocked at the time $t$4 prior to the arrival of the read-out signal. At the time $t$5, the read-out signal will be assumed to arrive by way of the digit line 11 at the point 1. Consequently, the potential $U_1$ prevailing at this point is increased, or reduced, in accordance with the nature of the read-out signal. The graphic illustration represents a readout signal which increases the potential $U_1$. Since, as illustrated in the drawing, no signal arrives by way of the digit line 22 at the point 2, the potential $U_2$ which prevail prior to the time $t$5, is retained at this point. At the time $t$6, the flip-flop is reconnected, as a result of the application of the potentials which prevail at the time t1 to the inputs 8 and 9. At the time $t$7, the transistors 12 and 13 in the flip-flop arms are rendered conductive again by way of the input 130. In accordance with the potentials prevailing at the nodes 8 and 9, the flip-flop triggers from the labile point into one of its stable states and the regenerating process commences.

During regeneration, the quantity of charge emitted during the read out process from a storage element of the storage field is read into the storage element.

Figure 4:
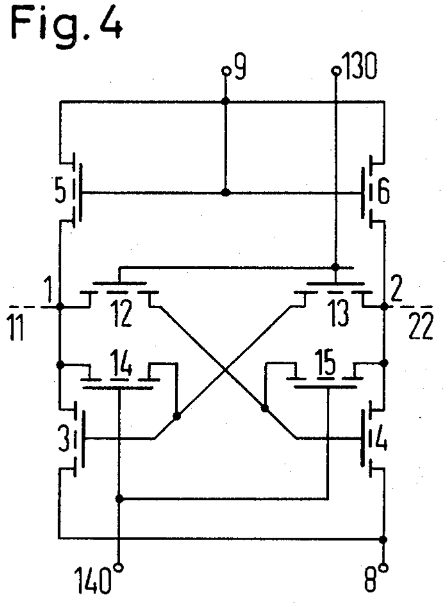
FIG. 4 is a schematic diagram of a regenerating circuit constructed in accordance with the invention.
Figure 5:
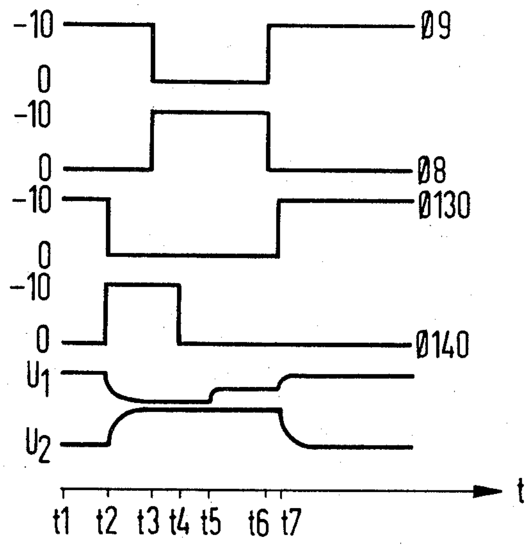
FIG. 5 is a pulse diagram provided to aid in the explanation of the functional sequence of the regenerating circuit illustrated in FIG. 4.
Figure 6:
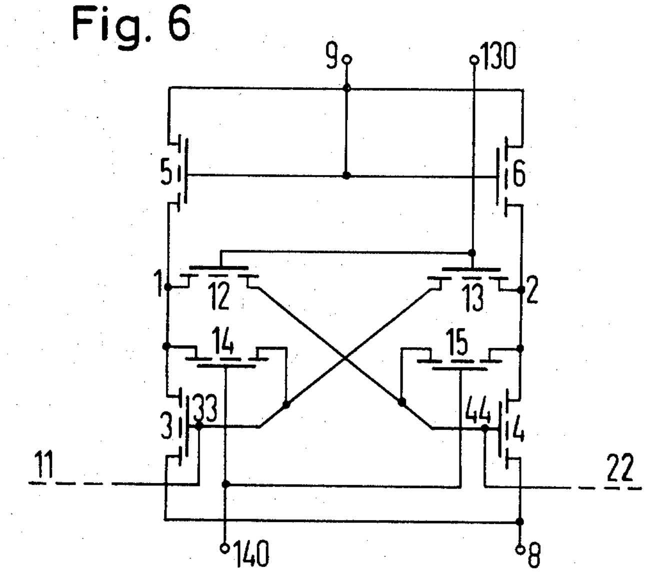
FIGS. 6 and 7 schematically illustrate additional regenerating circuits constructed in accordance with the invention.

FIG. 6 illustrates a further development of the circuit illustrated in FIG. 4. In this further development, the digit lines 11 and 22 are connected to the regenerating circuit at the points 33 and 34 shown in the drawing.

The advantage of this further development resides in that the digit lines connected to the inverting amplifier stage, whose input receives a favorable, predetermined potential.

In the above described regenerating circuits constructed in accordance with the invention, the adjustment of the potentials at the points 1 and 2 prior to the read-out process, sets an operative point which lies considerably closer to the labile point of the flip-flop than is the case in the earlier circuits of U.S. Pat. No. 3,774,176. Also, the above-described regenerating circuits are particularly well suited for symmetrical construction of the regenerating flip-flop. However, the aforementioned advantages are also achieved when the circuits are used in an asymmetrical flip-flop.

Figure 7:
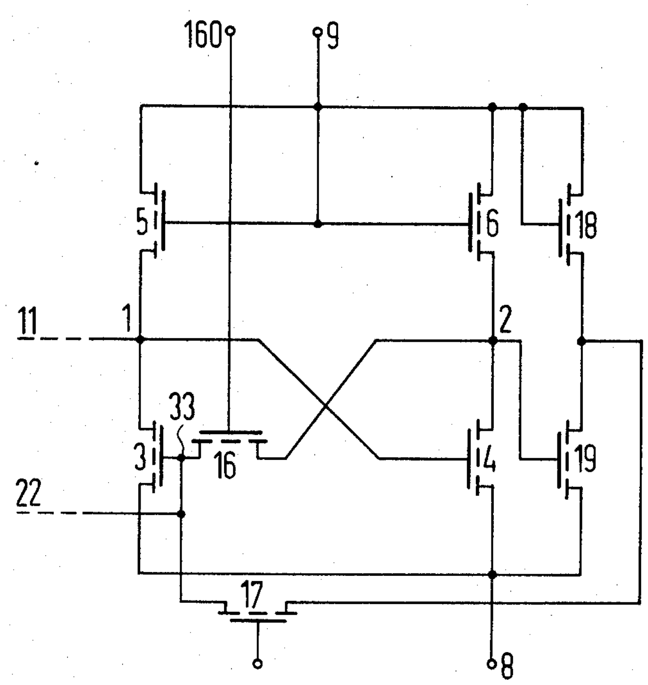

The regenerating circuit illustrated in FIG. 7 is particularly well suited for an asymmetrical design of the regenerating flip-flop. Details in FIG. 7 which have already been described in this reference to other circuits bear the same reference characters. In a flip-flop arm of the regenerating circuit there is arranged an inverter which consists of the transistors 18 and 19. Preferably, the transistors 18 and 19 are also field effect transistors. The inverter may be bridged by a transistor 16 which may be operated by way of an input 160. It is possible to cut off the output of the inverter from the flip-flop by way of a transistor 17. If the transistor 16 is rendered conductive, and if the transistor 17 blocks, the represented regenerating circuit is bistable. If, on the other hand, the transistor 16 blocks and the transistor 17 is rendered conductive, the regenerating circuit is monostable. In a bistable state of the regenerating circuit, the potentials across the points 1 and 2 correspond to the potentials of the labile point. The digit lines 11 and 22 are preferably connected to the points 1 and 33.

If the regenerating flip-flop is of asymmetrical design, and if only one digit line is connected, in the event of a suitable dimensioning of the flip-flop it is possible to achieve shorter regenerating times than with the circuit illustrated in FIG. 7, with two connected digit lines.

In addition to the advantage of shorter regenerating times, in comparison to the regenerating circuits represented in FIGS. 1, 4 and 6, the above-mentioned regenerating circuit possesses the advantage that the distance between the monostable and the labile point is shorter.

Although we have described our invention by reference to a particular illustrative embodiment thereof, many changes and modifications of the inventions may become apparent to those skilled in the art without departing from the spirit and scope of the invention. We therefore intend to include within the patent warranted hereon all such changes and modifications as may reasonably and properly be included within the scope of our contribution to the art.

We claim:

1. In a regenerating circuit for binary signals, in the form of a keyed flip-flop having one labile and two stable points, and with at least two inverting amplifier stages each including a switching transistor and a load transistor, in particular for stored signals and for the read-out of integrated single transistor storage elements which form a storage field in which the storage elements of the storage field are connected by way of a digit line to the regenerating circuit, the improvement therein comprising means for adjusting the inverting amplifier stages into the region of the labile point of the regenerating circuit, including a feedback circuit which comprises an odd number of inverter stages.

2. A regenerating circuit as set forth in claim 1, wherein said feedback circuit comprises at least one transistor connecting the input and output of each inverting amplifier stage, and wherein said flip-flop includes separately conducting feedback paths and electronic switching elements for opening and closing said paths.

3. A regenerating circuit according to claim 1 wherein each said switching transistor has a gate electrode connected to a digit line.

4. A regenerating circuit according to claim 1 wherein each said switching transistor has a drain electrode connected to a digit line.

5. A regenerating circuit according to claim 1, wherein the output of said inverter stage is connected to the input of an inverting amplifier stage so that the regenerating circuit comprises two inverting amplifier stages and one inverter stage connected in a chain.

6. A regenerating circuit according to claim 5, comprising electronic switches connected between the individual inverting amplifier stages.

7. A regenerating circuit according to claim 6, wherein said electronic switches and said inverting amplifier stages and said inverter stage are each constituted by field effect transistors.

* * * * *